US009512503B2

(12) United States Patent
Nakamura et al.

(10) Patent No.: US 9,512,503 B2
(45) Date of Patent: Dec. 6, 2016

(54) METHOD FOR NEUTRALIZING SULFURIC ACID ACIDIC SOLUTION AND HYDROMETALLURGICAL METHOD FOR NICKEL OXIDE ORE

(71) Applicant: SUMITOMO METAL MINING CO., LTD., Tokyo (JP)

(72) Inventors: Shinichiro Nakamura, Tokyo (JP); Osamu Nakano, Tokyo (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 15/021,364

(22) PCT Filed: Jan. 21, 2015

(86) PCT No.: PCT/JP2015/051511
§ 371 (c)(1),
(2) Date: Mar. 11, 2016

(87) PCT Pub. No.: WO2015/174103
PCT Pub. Date: Nov. 19, 2015

(65) Prior Publication Data
US 2016/0230249 A1    Aug. 11, 2016

(30) Foreign Application Priority Data

May 13, 2014    (JP) ................. 2014-099719

(51) Int. Cl.
*C02F 1/66* (2006.01)
*C22B 23/00* (2006.01)
(Continued)

(52) U.S. Cl.
CPC ............ *C22B 23/0461* (2013.01); *C02F 1/66* (2013.01); *C22B 3/04* (2013.01); *C22B 3/08* (2013.01);
(Continued)

(58) Field of Classification Search
CPC ............... C02F 1/66; C22B 3/08; C22B 3/44; C22B 23/0462; C22B 23/043
See application file for complete search history.

(56) References Cited

U.S. PATENT DOCUMENTS 3,617,560 A * 11/1971 Deul ................. C02F 1/529
210/716
2005/0265910 A1    12/2005 Kobayashi
(Continued)

FOREIGN PATENT DOCUMENTS

JP        S52-65970        5/1977
JP        WO 94/04497 A1   3/1994
(Continued)

OTHER PUBLICATIONS

JP H08-500523 A published Jan. 1996. machine translation.*
International Search Report for International Application No. PCT/JP2015/051511 dated Apr. 14, 2015.

*Primary Examiner* — George Wyszomierski
*Assistant Examiner* — Tima M McGuthry Banks
(74) *Attorney, Agent, or Firm* — Katz, Quintos & Hanson, LLP

(57) ABSTRACT

A hydrometallurgical method for nickel oxide ores, whereby the pH of a neutralized solution can be stabilized. The hydrometallurgical method comprises a sulfuric acid leaching step of leaching an ore slurry of a nickel oxide ore with sulfuric acid, a neutralization step of neutralizing a crude nickel sulfate aqueous solution by adding a neutralizing agent thereto, and a dezincification step of removing zinc as zinc sulfide by adding a sulfurizing agent to a neutralized solution; wherein in the neutralization step, the amount of the neutralizing agent added is adjusted using, as an index, a neutralizing agent addition ratio that indicates the amount (Continued)

of the neutralizing agent added relative to the amount of free sulfuric acid in the crude nickel sulfate aqueous solution.

6 Claims, 1 Drawing Sheet

(51) Int. Cl.
*C22B 3/08* (2006.01)
*C22B 3/44* (2006.01)
*C22B 3/00* (2006.01)
*C22B 3/04* (2006.01)

(52) U.S. Cl.
CPC ................. *C22B 3/44* (2013.01); *C22B 23/00* (2013.01); *C22B 23/043* (2013.01); *Y02P 10/234* (2015.11)

(56) References Cited

U.S. PATENT DOCUMENTS

| | | | |
|---|---|---|---|
| 2015/0151991 A1* | 6/2015 | Higuchi | ................... C02F 1/66 210/724 |
| 2015/0299007 A1* | 10/2015 | Nakai | ...................... C02F 1/66 210/724 |
| 2016/0024614 A1* | 1/2016 | Matsubara | .......... C22B 23/0407 75/743 |

FOREIGN PATENT DOCUMENTS

| | | |
|---|---|---|
| JP | H08-500523 | 1/1996 |
| JP | H10-146590 | 6/1998 |
| JP | 2005-350766 A1 | 12/2005 |

* cited by examiner

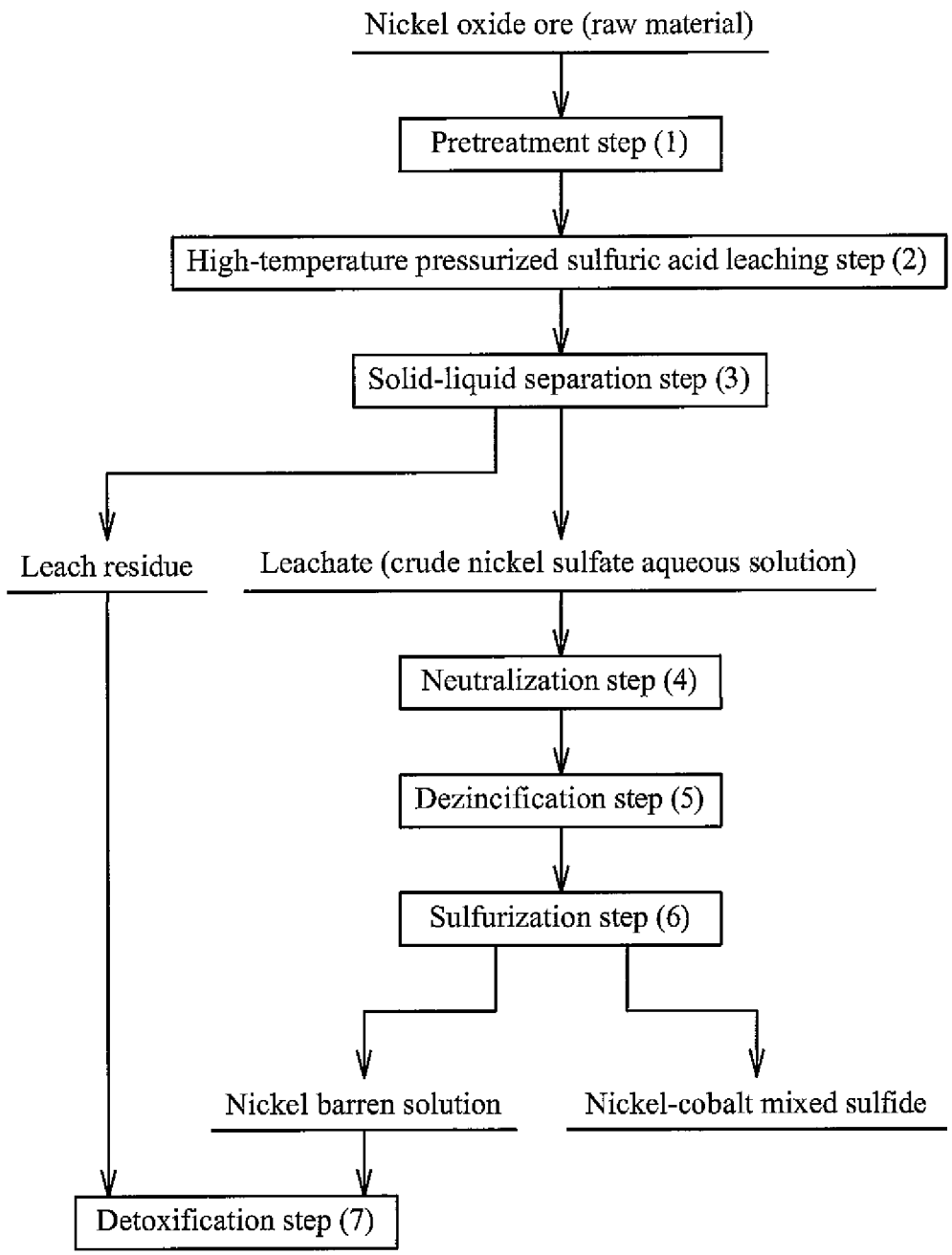

METHOD FOR NEUTRALIZING SULFURIC ACID ACIDIC SOLUTION AND HYDROMETALLURGICAL METHOD FOR NICKEL OXIDE ORE

TECHNICAL FIELD

The present invention relates to a method for neutralizing a sulfuric acid acidic solution and a hydrometallurgical method for nickel oxide ores. More specifically, the present invention relates to a method for neutralizing a sulfuric acid acidic solution for neutralizing a crude nickel sulfate aqueous solution in the neutralization step in the hydrometallurgy of a nickel oxide ore, and also relates to a hydrometallurgical method for nickel oxide ores.

BACKGROUND ART

As a hydrometallurgical method whereby valuable metals, such as nickel and cobalt, are recovered from low-grade nickel oxide ores, typified by limonite ores, etc., a high-temperature pressurized sulfuric acid leaching method, which is high-pressure acid leaching (HPAL) using sulfuric acid, is known.

As shown in FIG. 1, hydrometallurgy for obtaining a nickel-cobalt mixed sulfide from a nickel oxide ore comprises a pretreatment step (1), a high-temperature pressurized sulfuric acid leaching step (2), a solid-liquid separation step (3), a neutralization step (4), a dezincification step (5), a sulfurization step (6), and a detoxification step (7) (see, for example, PTL 1).

In the pretreatment step (1), a nickel oxide ore is ground and classified to prepare an ore slurry. In the high-temperature pressurized sulfuric acid leaching step (2), sulfuric acid is added to the ore slurry obtained in the pretreatment step (1), and high-temperature pressurized acid leaching is performed by stirring the mixture at 220 to 280° C. to thereby obtain a leached slurry. In the solid-liquid separation step (3), the leached slurry obtained in the high-temperature pressurized sulfuric acid leaching step (2) is subjected to solid-liquid separation to obtain a leachate (a crude nickel sulfate aqueous solution) containing nickel and cobalt as well as impurity elements, and a leach residue.

In the neutralization step (4), the crude nickel sulfate aqueous solution obtained in the solid-liquid separation step (3) is neutralized, and a neutralized precipitate containing impurity elements is separated to obtain a neutralized solution containing nickel and cobalt as well as zinc. In the dezincification step (5), hydrogen sulfide gas is added to the neutralized solution obtained in the neutralization step (4), and zinc is precipitated and removed as zinc sulfide to obtain a nickel recovery mother liquor containing nickel and cobalt. In the sulfurization step (6), hydrogen sulfide gas is added to the nickel recovery mother liquor obtained in the dezincification step (5) to obtain a nickel-cobalt mixed sulfide and a nickel barren solution. In the detoxification step (7), the leach residue generated in the solid-liquid separation step (3) and the nickel barren solution generated in the sulfurization step (6) are detoxified.

The solubility of sulfide in the pH range in the above hydrometallurgy is lower in zinc than in nickel and cobalt, and zinc is more likely to be precipitated as sulfide even at the same pH. In the dezincification step (5), taking advantage of this solubility difference, zinc, which is an impurity, is selectively precipitated and removed by controlling the amount of a sulfurizing agent added and adjusting the pH.

Here, the pH adjustment is performed in the neutralization step (4), which is the preceding step of the dezincification step (5). In the neutralization step (4), the pH of the neutralized solution (dezincification step start solution) is adjusted by controlling the amount of the neutralizing agent added based on the value measured by a pH meter.

However, the pH meter is likely to be affected by changes in the liquid temperature, and neutralized precipitates adhere to the surface of the pH meter due to a long-term operation. Because of these influences, values measured by the pH meter change, thereby causing insufficient addition or excessive addition of the neutralizing agent.

If the pH of the neutralized solution decreases due to insufficient addition of the neutralizing agent, there is a problem that the removal efficiency of zinc in the dezincification step (5) is reduced. On the other hand, if the pH of the neutralized solution increases due to excessive addition of the neutralizing agent, fine particles of hydroxide and plaster floating in the neutralized solution increase. Accordingly, there is a problem that in the dezincification step (5), the filter cloth of the solid-liquid separator that performs solid-liquid separation to separate zinc sulfide and a nickel recovery mother liquor is clogged, thereby leading to a reduction in the efficiency of solid-liquid separation.

CITATION LIST

Patent Literature

PTL 1: JP2005-350766A

SUMMARY OF INVENTION

Technical Problem

In consideration of the above circumstances, an object of the present invention is to provide a method for neutralizing a sulfuric acid acidic solution, whereby the pH of a neutralized solution can be stabilized.

Another object of the present invention is to provide a hydrometallurgical method for nickel oxide ores, whereby the removal efficiency of zinc can be maintained in the dezincification step, and the efficiency of solid-liquid separation can be maintained.

Solution to Problem

The method for neutralizing a sulfuric acid acidic solution according to a first invention is a method for neutralizing a sulfuric acid acidic solution by adding a neutralizing agent thereto, and is characterized in that the flow rate of the sulfuric acid acidic solution is measured to determine a neutralization start solution flow rate, the flow rate of the neutralizing agent is measured to determine a neutralizing agent addition flow rate, the sulfuric acid acidic solution is sampled at predetermined time intervals to measure a free sulfuric acid concentration by a titration method, and the free sulfuric acid concentration is used as a free sulfuric acid coefficient, a neutralizing agent addition ratio is determined using the neutralization start solution flow rate, the neutralizing agent addition flow rate, and the free sulfuric acid coefficient, wherein the neutralizing agent addition ratio is represented by the following formula:

$$R = Qc/(Qs \times C)$$

wherein R is the neutralizing agent addition ratio, Qc is the neutralizing agent addition flow rate, Qs is the neutralization start solution flow rate, and C is the free sulfuric acid coefficient, and the amount of the neutralizing agent added is adjusted using, as an index, the neutralizing agent addition ratio to thereby neutralize the sulfuric acid acidic solution to a desired pH without using a pH meter.

The method for neutralizing a sulfuric acid acidic solution according to a second invention is characterized in that in the first invention, the amount of the neutralizing agent added is adjusted so that the neutralizing agent addition ratio is maintained at a predetermined target value.

The method for neutralizing a sulfuric acid acidic solution according to a third invention is characterized in that in the first invention, the amount of the neutralizing agent added is adjusted so that the neutralizing agent addition ratio is within a predetermined range.

The hydrometallurgical method for nickel oxide ores according to a fourth invention is characterized in that the method comprises a sulfuric acid leaching step of leaching an ore slurry of a nickel oxide ore with sulfuric acid, a neutralization step of neutralizing a crude nickel sulfate aqueous solution obtained in the sulfuric acid leaching step by adding a neutralizing agent thereto, and a dezincification step of removing zinc as zinc sulfide by adding a sulfurizing agent to a neutralized solution obtained in the neutralization step; and that in the neutralization step, the flow rate of the crude nickel sulfate aqueous solution is measured to determine a neutralization start solution flow rate, the flow rate of the neutralizing agent is measured to determine a neutralizing agent addition flow rate, the crude nickel sulfate aqueous solution is sampled at predetermined time intervals to measure a free sulfuric acid concentration by a titration method, and the free sulfuric acid concentration is used as a free sulfuric acid coefficient, a neutralizing agent addition ratio is determined using the neutralization start solution flow rate, the neutralizing agent addition flow rate, and the free sulfuric acid coefficient, wherein the neutralizing agent addition ratio is represented by the following formula:

$$R=Qc/(Qs \times C)$$

wherein R is the neutralizing agent addition ratio, Qc is the neutralizing agent addition flow rate, Qs is the neutralization start solution flow rate, and C is the free sulfuric acid coefficient, and the amount of the neutralizing agent added is adjusted using, as an index, the neutralizing agent addition ratio to thereby neutralize the crude nickel sulfate aqueous solution to a desired pH without using a pH meter.

The hydrometallurgical method for nickel oxide ores according to a fifth invention is characterized in that in the fourth invention, the amount of the neutralizing agent added is adjusted so that the neutralizing agent addition ratio is maintained at a predetermined target value.

The hydrometallurgical method for nickel oxide ores according to a sixth invention is characterized in that in the fourth invention, the amount of the neutralizing agent added is adjusted so that the neutralizing agent addition ratio is within a predetermined range.

Advantageous Effects of Invention

According to the first invention, the amount of the neutralizing agent added can be adjusted without using a pH meter; therefore, the method is not affected by changes in the liquid temperature or by neutralized precipitates adhering to the pH meter, can prevent insufficient addition and excessive addition of the neutralizing agent, and can stabilize the pH of the neutralized solution. Additionally, the neutralizing agent addition ratio can be determined from the neutralizing agent addition flow rate and the neutralization start solution flow rate.

According to the second invention, the amount of the neutralizing agent added is adjusted so that the neutralizing agent addition ratio is maintained at a predetermined target value; therefore, the sulfuric acid acidic solution can be neutralized to a desired pH.

According to the third invention, the amount of the neutralizing agent added is adjusted so that the neutralizing agent addition ratio is within a predetermined range; therefore, the sulfuric acid acidic solution can be neutralized to a desired pH.

According to the fourth invention, the pH of the neutralized solution can be stabilized; therefore, the removal efficiency of zinc can be maintained in the dezincification step, and the solid-liquid separator can be prevented from clogging to thereby maintain the efficiency of solid-liquid separation.

According to the fifth invention, the amount of the neutralizing agent added is adjusted so that the neutralizing agent addition ratio is maintained at a predetermined target value; therefore, the crude nickel sulfate aqueous solution can be neutralized to a desired pH.

According to the sixth invention, the amount of the neutralizing agent added is adjusted so that the neutralizing agent addition ratio is within a predetermined range; therefore, the crude nickel sulfate aqueous solution can be neutralized to a desired pH.

BRIEF DESCRIPTION OF DRAWING

FIG. 1 shows the whole process of the hydrometallurgical method.

DESCRIPTION OF EMBODIMENTS

Next, embodiments of the present invention are described with reference to the drawing.

The hydrometallurgical method for nickel oxide ores according to one embodiment of the present invention is applied to hydrometallurgy using a high-temperature pressurized sulfuric acid leaching method, whereby nickel is recovered from nickel oxide ores. Usable nickel oxide ores are low-grade nickel oxide ores, typified by limonite ores, etc.

Since the overall flow of the hydrometallurgy is the same as conventional hydrometallurgy, its explanation is omitted (see FIG. 1). The hydrometallurgical method of the present invention may comprise at least a sulfuric acid leaching step of leaching an ore slurry of a nickel oxide ore with sulfuric acid (corresponding to the high-temperature pressurized sulfuric acid leaching step in FIG. 1), a neutralization step of neutralizing a leachate (a crude nickel sulfate aqueous solution) obtained in the sulfuric acid leaching step by adding a neutralizing agent thereto, and a dezincification step of removing zinc as zinc sulfide by adding a sulfurizing agent to a neutralized solution obtained in the neutralization step. Other steps may be added or omitted.

In the neutralization step, the crude nickel sulfate aqueous solution obtained in the high-temperature pressurized sulfuric acid leaching step and the solid-liquid separation step is supplied as a neutralization start solution to a neutralization tank, and a neutralizing agent is added to neutralize the solution to a pH of about 3 to 4, thereby precipitating impurity elements as neutralized precipitates. Thereafter, solid-liquid separation is performed to obtain the neutralized precipitates and a neutralized solution containing nickel and cobalt as well as zinc. The pH adjustment in the neutralization step can be performed by adjusting the amount of the neutralizing agent added.

As the neutralizing agent, an aqueous solution or slurry of an alkali metal hydroxide or alkali metal carbonate is used; however, it is preferable to use calcium carbonate, which is industrially inexpensive. In this case, the impurity elements are each hydrolyzed by neutralization of free acid, and precipitated and deposited, as shown in the following reaction formulas (Chemical Formula 1) to (Chemical Formula 4):

$$H_2SO_4 + CaCO_3 + H_2O = CaSO_4 \cdot 2H_2O + CO_2 \uparrow \quad \text{(Chemical Formula 1)}$$

$$Fe_2(SO_4)_3 + 3CaCO_3 + 9H_2O = 2Fe(OH)_3 + 3CaSO_4 \cdot 2H_2O + 3CO_2 \uparrow \quad \text{(Chemical Formula 2)}$$

$$Cr_2(SO_4)_3 + 3CaCO_3 + 9H_2O = 2Cr(OH)_3 + 3CaSO_4 \cdot 2H_2O + 3CO_2 \uparrow \quad \text{(Chemical Formula 3)}$$

$$Al_2(SO_4)_3 + 3CaCO_3 + 9H_2O = 2Al(OH)_3 + 3CaSO_4 \cdot 2H_2O + 3CO_2 \uparrow \quad \text{(Chemical Formula 4)}$$

In the dezincification step, the neutralized solution is supplied to a sulfurization reaction tank, and a sulfurizing agent, such as hydrogen sulfide gas or sodium hydrosulfide, is added to sulfurize zinc, copper, etc., contained in the neutralized solution. Thereafter, solid-liquid separation is performed by a solid-liquid separator, such as a filter press, to thereby obtain sulfide and a nickel recovery mother liquor containing nickel and cobalt.

The solubility of sulfide in the pH range in this hydrometallurgy is lower in zinc than in nickel and cobalt, and zinc is more likely to be precipitated as sulfide even at the same pH. In the dezincification step, taking advantage of this solubility difference, zinc, which is an impurity, is selectively precipitated and removed by controlling the amount of the sulfurizing agent added and adjusting the pH.

The method for neutralizing a sulfuric acid acidic solution according to one embodiment of the present invention is suitability applied to the neutralization step in the above hydrometallurgy of nickel oxide ores.

The present inventors found that when the amount of the neutralizing agent added was adjusted in the above neutralization step using a neutralizing agent addition ratio, described later, as an index, the pH of the neutralized solution could be adjusted without using a pH meter, and consequently, the pH of the neutralized solution could be stabilized.

Here, the neutralizing agent addition ratio is an index that indicates the amount of the neutralizing agent added relative to the amount of free sulfuric acid in the sulfuric acid acidic solution (crude nickel sulfate aqueous solution). The neutralizing agent addition ratio is represented by, for example, the following Formula 1:

$$R = Qc/(Qs \times C) \quad \text{(Formula 1)}$$

wherein R is the neutralizing agent addition ratio, Qc is a neutralizing agent addition flow rate, Qs is a neutralization start solution flow rate, and C is a free sulfuric acid coefficient.

The neutralization start solution flow rate Qs is a flow rate of the neutralization start solution (crude nickel sulfate aqueous solution) supplied to the neutralization tank. Therefore, Qs can be measured by providing a flowmeter in the pipe supplying the neutralization start solution to the neutralization tank.

The neutralizing agent addition flow rate Qc is a flow rate of the neutralizing agent (e.g., calcium carbonate) added to the neutralization tank. Therefore, Qc can be measured by providing a flowmeter in the pipe supplying the neutralizing agent to the neutralization tank.

Free sulfuric acid is unreacted sulfuric acid remaining in the leachate (crude nickel sulfate aqueous solution). The free sulfuric acid concentration varies depending on the operating conditions of the high-temperature pressurized sulfuric acid leaching step. For example, the operation is performed by adjusting the sulfuric acid concentration of the crude nickel sulfate aqueous solution to about 40 to 50 g/L (pH≈0). The free sulfuric acid concentration can be measured using the titration method by sampling the crude nickel sulfate aqueous solution every one to two hours. A larger amount of free sulfuric acid increases the leaching efficiency of valuable metals; however, the facility is adversely affected and corroded, and the amount of the neutralizing agent used in the neutralization step increases. Therefore, the amount of free sulfuric acid is adjusted within the above predetermined range. The free sulfuric acid coefficient C is a numerical value that represents the free sulfuric acid concentration of the crude nickel sulfate solution. For example, when the free sulfuric acid concentration is 45 g/L, C is 45.

The free sulfuric acid coefficient C determined in this manner, and the neutralizing agent addition flow rate Qc and the neutralization start solution flow rate Qs measured by flowmeters are substituted into Formula 1, thereby determining, in real-time, the neutralizing agent addition ratio R corresponding to the measurement frequency of the free sulfuric acid concentration. The absolute value of the neutralizing agent addition ratio R means nothing, and the neutralizing agent addition ratio R is used as an index for relatively comparing the amount of free sulfuric acid and the amount of the neutralizing agent introduced into the neutralization tank.

The amount of the neutralizing agent added is adjusted using the determined neutralizing agent addition ratio R as an index. The method for adjusting the amount of the neutralizing agent added is not particularly limited. For example, the amount of the neutralizing agent added may be adjusted so that the neutralizing agent addition ratio R is maintained at a predetermined target value. The target value of the neutralizing agent addition ratio R is a numerical value that represents the amount of the neutralizing agent added necessary for the neutralization start solution introduced into the neutralization tank to be neutralized to a target pH. In the actual operation, when the free sulfuric acid concentration of the neutralization start solution changes, the neutralizing agent addition ratio R also changes to deviate from the target value. In this case, the neutralized solution can be adjusted to the target pH by adjusting the amount of the neutralizing agent added so that the neutralizing agent addition ratio R is close to the target value.

When automatic control is performed, the neutralizing agent addition ratio R may be maintained at a target value by performing feedback control using the neutralizing agent addition ratio R as the controlled variable, and the amount of added neutralizing agent as the manipulated variable. When the neutralizing agent addition ratio R is less than the target value, the operation of increasing the amount of the neutralizing agent added is performed. Conversely, when the neutralizing agent addition ratio R is higher than the target value, the operation of decreasing the amount of the neutralizing agent added is performed.

Moreover, the amount of the neutralizing agent added may be adjusted so that the neutralizing agent addition ratio R is within a predetermined range. Specifically, the upper limit and lower limit of the neutralizing agent addition ratio R are determined. When the neutralizing agent addition ratio R is less than the lower limit, the operation of increasing the amount of the neutralizing agent added is performed. Conversely, when the neutralizing agent addition ratio R is higher than the upper limit, the operation of decreasing the amount of the neutralizing agent added is performed.

When a control is performed in this manner, the amount of the neutralizing agent added can be automatically adjusted, and the crude nickel sulfate aqueous solution can be neutralized to a desired pH. Moreover, the amount of the neutralizing agent added can be increased or decreased depending on the increase or decrease in the neutralization start solution flow rate.

As described above, when the regularly measured free sulfuric acid concentration (free sulfuric acid coefficient C) and the stable numerical values, i.e., neutralizing agent addition flow rate Qc and neutralization start solution flow rate Qs, are used, the amount of the neutralizing agent added can be adjusted without using a pH meter; therefore, the method is not affected by changes in the liquid temperature or by neutralized precipitates adhering to the pH meter, and can prevent insufficient addition and excessive addition of the neutralizing agent. As a result, the pH of the neutralized solution can be stabilized.

Further, because the pH of the neutralized solution can be stabilized, the pH of the neutralized solution is not reduced due to insufficient addition of the neutralizing agent, and the removal efficiency of zinc can be maintained in the dezincification step. Moreover, the pH of the neutralized solution is not raised due to excessive addition of the neutralizing agent, and fine particles of hydroxide or plaster floating in the neutralized solution do not increase. Accordingly, the filter cloth of the solid-liquid separator in the dezincification step can be prevented from clogging, thereby maintaining the efficiency of solid-liquid separation.

Furthermore, because the pH of the neutralized solution is stabilized, the amount of the sulfurizing agent added in the dezincification step can be reduced.

As described above, the hydrometallurgy for obtaining a nickel cobalt mixed sulfide from nickel oxide ores comprises a pretreatment step (1), a high-temperature pressurized sulfuric acid leaching step (2), a solid-liquid separation step (3), a neutralization step (4), a dezincification step (5), a sulfurization step (6), and a detoxification step (7) (see FIG. 1). In this process, a quasi-neutralization step may be added between the high-temperature pressurized sulfuric acid leaching step (2) and the solid-liquid separation step (3), in order to increase the efficiency of the solid-liquid separation step. The method for neutralizing a sulfuric acid acidic solution according to the present invention can also be applied to the quasi-neutralization step. The stabilization of the pH of the neutralization step start solution can be attained, and the pH can be stabilized in the neutralization step.

Moreover, the method for neutralizing a sulfuric acid acidic solution according to the present invention can be applied to any step, as long as it is a step of neutralizing a sulfuric acid acidic solution by adding a neutralizing agent thereto. The method of the present invention can be applied to steps other than the neutralization step in the hydrometallurgy of nickel oxide ores.

EXAMPLES

Next, Examples are described.
(Common Conditions)

The amount of a neutralizing agent added was adjusted in the neutralization step in the hydrometallurgy of a nickel oxide ore. The facility of the neutralization step comprises two systems: a first system and a second system. Each system includes a quasi-neutralization step and a neutralization step, and the amount of the neutralizing agent added is adjusted in each step. The free sulfuric acid concentration of a crude nickel sulfate solution was measured every two hours by the titration method. The value of the free sulfuric acid concentration [g/L] was directly used as the free sulfuric acid coefficient C. That is, the value of the neutralizing agent addition ratio R was updated every two hours. The measurement of the pH of a neutralized solution, described later, was performed one hour later after the measurement of the free sulfuric acid concentration.

Example 1

The amount of the neutralizing agent added was adjusted using the neutralizing agent addition ratio R as an index. In each step of each system, the pH of the neutralized solution was measured 20 times every two hours. A pH meter was used to measure the pH. Table 1 shows the standard deviation of the 20 values measured in each step of each system.

Comparative Example 1

The amount of the neutralizing agent added was adjusted using the value measured by a pH meter as an index. In each step of each system, the pH of the neutralized solution was measured 18 times every two hours. A pH meter was used to measure the pH. Table 1 shows the standard deviation of the 18 values measured in each step of each system.

TABLE 1

| | | Example 1 | Comparative Example 1 | Difference |
|---|---|---|---|---|
| First system | Quasi-neutralization step | 0.021 | 0.137 | 0.116 |
| | Neutralization step | 0.021 | 0.036 | 0.015 |
| Second system | Quasi-neutralization step | 0.031 | 0.094 | 0.063 |
| | Neutralization step | 0.009 | 0.021 | 0.012 |

Table 1 shows that the standard deviation of the pH of the neutralized solution in Example 1 was smaller by about 60% on average than that of Comparative Example 1, demonstrating that the pH variation in Example 1 was smaller than that in Comparative Example 1. This confirmed that according to Example 1, the pH of the neutralized solution could be stabilized.

Moreover, when the amount of the sulfurizing agent added in the dezincification step was confirmed, the amount in Example 1 was lower by 6.2% than that in Comparative Example 1. This confirmed that according to Example 1, the amount of the sulfurizing agent added in the dezincification step could be reduced.

The invention claimed is:
1. A method for neutralizing a sulfuric acid acidic solution by adding a neutralizing agent thereto, wherein the flow rate of the sulfuric acid acidic solution is measured to determine a neutralization start solution flow rate, the flow rate of the neutralizing agent is measured to determine a neutralizing agent addition flow rate, the sulfuric acid acidic solution is sampled at predetermined time intervals to measure a free sulfuric acid concentration by a titration method, and the free sulfuric acid concentration is used as a free sulfuric acid coefficient, a neutralizing agent addition ratio is determined using the neutralization start solution flow rate, the neutralizing agent addition flow rate, and the free sulfuric acid coefficient, wherein the neutralizing agent addition ratio is represented by the following formula:

$$R=Qc/(Qs \times C)$$

wherein R is the neutralizing agent addition ratio, Qc is the neutralizing agent addition flow rate, Qs is the neutralization start solution flow rate, and C is the free sulfuric acid coefficient, and the amount of the neutralizing agent added is adjusted using, as an index, the neutralizing agent addition ratio to thereby neutralize the sulfuric acid acidic solution to a desired pH without using a pH meter.

2. The method for neutralizing a sulfuric acid acidic solution according to claim 1, wherein the amount of the neutralizing agent added is adjusted so that the neutralizing agent addition ratio is maintained at a predetermined target value.

3. The method for neutralizing a sulfuric acid acidic solution according to claim 1, wherein the amount of the neutralizing agent added is adjusted so that the neutralizing agent addition ratio is within a predetermined range.

4. A hydrometallurgical method for nickel oxide ores, is the method comprising:

a sulfuric acid leaching step of leaching an ore slurry of a nickel oxide ore with sulfuric acid;

a neutralization step of neutralizing a crude nickel sulfate aqueous solution obtained in the sulfuric acid leaching step by adding a neutralizing agent thereto; and a dezincification step of removing zinc as zinc sulfide by adding a sulfurizing agent to a neutralized solution obtained in the neutralization step;

wherein in the neutralization step, the flow rate of the crude nickel sulfate aqueous solution is measured to determine a neutralization start solution flow rate, the flow rate of the neutralizing agent is measured to determine a neutralizing agent addition flow rate, the crude nickel sulfate aqueous solution is sampled at predetermined time intervals to measure a free sulfuric acid concentration by a titration method, and the free sulfuric acid concentration is used as a free sulfuric acid coefficient, a neutralizing agent addition ratio is determined using the neutralization start solution flow rate, the neutralizing agent addition flow rate, and the free sulfuric acid coefficient, wherein the neutralizing agent addition ratio is represented by the following formula:

$$R=Qc/(Qs \times C)$$

wherein R is the neutralizing agent addition ratio, Qc is the neutralizing agent addition flow rate, Qs is the neutralization start solution flow rate, and C is the free sulfuric acid coefficient, and the amount of the neutralizing agent added is adjusted using, as an index, the neutralizing agent addition ratio to thereby neutralize the crude nickel sulfate aqueous solution to a desired pH without using a pH meter.

5. The hydrometallurgical method for nickel oxide ores according to claim 4, wherein the amount of the neutralizing agent added is adjusted so that the neutralizing agent addition ratio is maintained at a predetermined target value.

6. The hydrometallurgical method for nickel oxide ores according to claim 4, wherein the amount of the neutralizing agent added is adjusted so that the neutralizing agent addition ratio is within a predetermined range.

* * * * *